United States Patent
Tang et al.

(10) Patent No.: US 9,100,123 B2
(45) Date of Patent: Aug. 4, 2015

(54) QSFP TO 4X10GBASE-T CONVERTER CABLE ASSEMBLY

(71) Applicant: Cisco Technology, Inc., San Jose, CA (US)

(72) Inventors: Norman Tang, Los Altos, CA (US);
Liang Ping Peng, Santa Clara, CA (US);
David Lai, Mountain View, CA (US);
Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/912,612

(22) Filed: Jun. 7, 2013

(65) Prior Publication Data

US 2014/0363171 A1 Dec. 11, 2014

(51) Int. Cl.
| | | |
|---|---|---|
| *H04B 10/00* | (2013.01) | |
| *H04B 10/40* | (2013.01) | |
| *H01R 24/64* | (2011.01) | |
| *H01R 31/00* | (2006.01) | |

(52) U.S. Cl.
CPC ............... *H04B 10/40* (2013.01); *H01R 24/64* (2013.01); *H01R 31/005* (2013.01)

(58) Field of Classification Search
CPC .............. H04B 10/00; H04B 2001/00; H04B 2201/00; H04B 2203/00; H04B 2210/00; H04B 2215/00
USPC .......................................... 398/135, 136, 138
See application file for complete search history.

(56) References Cited

U.S. PATENT DOCUMENTS

| | | | |
|---|---|---|---|
| 2010/0274876 A1 | 10/2010 | Kagan et al. | |
| 2011/0250791 A1* | 10/2011 | Straka et al. | 439/607.09 |
| 2011/0255574 A1 | 10/2011 | Carter et al. | |
| 2011/0299858 A1 | 12/2011 | Mazzini et al. | |
| 2012/0051735 A1 | 3/2012 | Achkir et al. | |
| 2012/0071011 A1* | 3/2012 | Kagan et al. | 439/76.1 |
| 2012/0301134 A1* | 11/2012 | Davari et al. | 398/9 |
| 2012/0308180 A1* | 12/2012 | Tosetti et al. | 385/28 |
| 2013/0005178 A1* | 1/2013 | Straka et al. | 439/497 |
| 2014/0207922 A1* | 7/2014 | Ao | 709/221 |

OTHER PUBLICATIONS

SFPcables, www.sfpcables.com/qsfp-cable-cab-qsfp-4sfp-p3m-30, Sep. 2012.*
Marvell Semiconductor, Marvell Alaska 88E1112: 10/100/1000 Gigabit Ethernet Transceiver with Auto-Media Detect, Feb. 2008.*
Avago Technologies, AFBR-79EIDZ: QSFP+ iSR4 Pluggable, Parallel Fiber-Optics Module for 40Gb Ethernet, 4×10Gb Ethernet and InfiniBand Application.*

* cited by examiner

*Primary Examiner* — David Payne
*Assistant Examiner* — Pranesh Barua
(74) *Attorney, Agent, or Firm* — Edell, Shapiro & Finnan, LLC (57) ABSTRACT

A Quad Small Form-Factor Pluggable (QSFP) transceiver module is provided that is configured to interface with a QSFP host and to send and receive a plurality of data signals at a data rate of up to forty gigabits per second (40 G). A plurality of 10GBase-T ports with Registered Jack (RJ) 45 connectors is also provided, wherein each of the 10GBase-T ports is configured to interface with a 10GBase-T device to send and receive a plurality of data signals at a data rate of ten gigabits per second (10 G). Cables are configured to interface with the QSFP transceiver module and with corresponding ones of the 10GBase-T ports with the RJ45 connectors. Each of the plurality of cables operates as a data channel for data flow between the QSFP transceiver module and the corresponding ones of the 10GBase-T ports with the RJ45 connectors.

17 Claims, 5 Drawing Sheets

QSFP TO 4X10GBASE-T CONVERTER CABLE ASSEMBLY

TECHNICAL FIELD

The present disclosure relates to enabling data transmissions between a Quad Small Form-Factor Pluggable (QSFP) transceiver module and a plurality of 10GBase-T ports with Registered Jack (RJ) 45 connectors.

BACKGROUND

Multiple Source Agreement (MSA) specifications for a Quad Small Form-Factor Pluggable (QSFP) transceiver module define a hot-pluggable module that integrates four transmit and four receive channels with a standard multi-fiber push-on (MPO) parallel optical connector for high-density applications. QSFP and enhanced QSFP (QSFP+) transceiver modules enable data communications at a data rate of up to forty gigabits per second (40 G). For example, the QSFP+ transceiver module may send and receive 40 G data across four 10 G data paths. Presently, however, due to physical constraints as well as power and thermal challenges, QSFP modules cannot interface with copper 10GBase-T ports that have Registered Jack (RJ) 45 connectors (as defined by the Institute of Electrical and Electronic (IEEE) standard 802.3an-2006).

DESCRIPTION OF EXAMPLE EMBODIMENTS

Overview

A Quad Small Form-Factor Pluggable (QSFP) transceiver module is provided that is configured to interface with a QSFP host and to send and receive a plurality of data signals at a data rate of up to forty gigabits per second (40 G). A plurality of 10GBase-T ports with Registered Jack (RJ) 45 connectors is also provided, wherein each of the 10GBase-T ports is configured to interface with a 10GBase-T device to send and receive a plurality of data signals at a data rate of ten gigabits per second (10 G). Cables are configured to interface with the QSFP transceiver module and with corresponding ones of the 10GBase-T ports with the RJ45 connectors. Each of the plurality of cables operates as a data channel for data flow between the QSFP transceiver module and the corresponding ones of the 10GBase-T ports with the RJ45 connectors.

Example Embodiments

Figure 1:
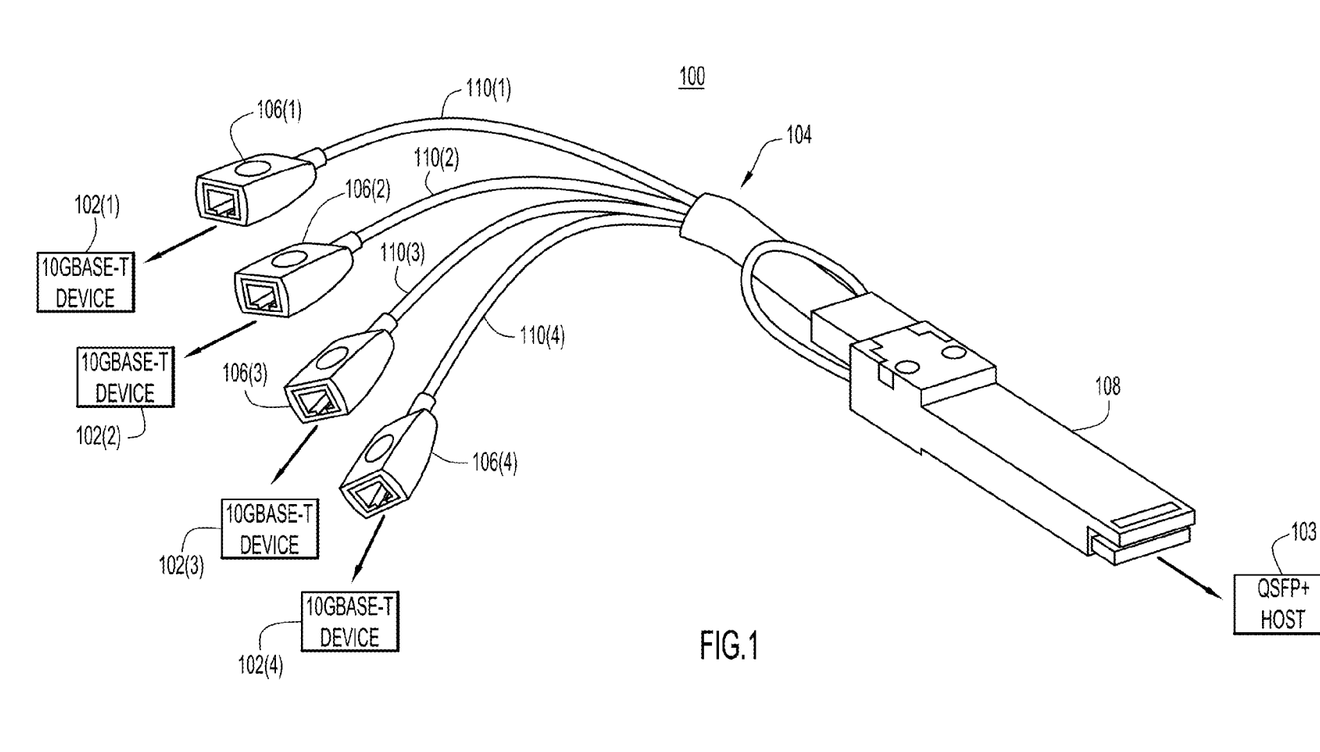
FIG. 1 shows an example topology depicting a cable assembly that comprises a Quad Small Form-Factor Pluggable (QSFP) transceiver module, a plurality of cables and a plurality of 10GBase-T ports with Registered Jack (RJ) 45 connectors for data communications.

The techniques presented herein are directed to sending and receiving data communications across cables between a Quad Small Form-Factor Pluggable (QSFP) transceiver module and/or an enhanced QSFP (QSFP+) transceiver module and a plurality of 10GBase-T ports with Registered Jack (RJ) 45 connectors. An example topology 100 is illustrated in FIG. 1. In FIG. 1, there is a plurality of system devices, shown at reference numerals 102(1)-102(4) and a host device, shown at reference numeral 103. The system devices 102(1)-102(4) are 10GBase-T devices configured to send and receive communications across a copper cable as defined by the Institute of Electrical and Electronic (IEEE) standard 802.3an-2006, and the host network device 103 is a QSFP/QSFP+ host device as defined by the Multiple Source Agreement (MSA) specifications. The system devices 102(1)-102(4) are thus referred to hereinafter as the "10GBase-T devices." The QSFP/QSFP+ host device 103 may be either a QSFP device or a QSFP+ device. For simplicity, the host device 103 is referred to hereinafter as a "QSFP+ host device" or a "QSFP+ host."

There is a cable assembly shown at reference numeral 104. The cable assembly 104 comprises a plurality of 10GBase-T ports, each of which has a corresponding RJ45 connector. The 10GBase-T ports with the RJ45 connectors are shown at reference numerals 106(1)-106(4). The cable assembly 104 also has a QSFP/QSFP+ transceiver module 108. The 10GBase-T ports with corresponding RJ45 connectors may be referred to hereinafter simply as "10GBase-T ports." The QSFP/QSFP+ transceiver module 108 is referred to generally hereinafter as a "QSFP+ transceiver module," though it should be appreciated that it may be either a QSFP transceiver module or a QSFP+ transceiver module. The 10GBase-T ports 106(1)-106(4) are configured to interface or connect to corresponding 10GBase-T devices 102(1)-102(4), and the QSFP+ transceiver module 108 is configured to interface or plug into the QSFP+ host 103. The cable assembly 104 also comprises a plurality of cables, shown at reference numerals 110(1)-110(4). Each of the cables 110(1)-110(4) corresponds to one of the 10GBase-T ports 106(1)-106(4) to enable communications between the 10GBase-T ports 106(1)-106(4) and the QSFP+ transceiver module 108. In one example, the cable assembly 104 may be referred to as a QSFP to 4×10GBase-T cable assembly.

When the 10GBase-T ports 106(1)-106(4) and the QSFP+ transceiver module 108 connect to respective 10GBase-T devices 102(1)-102(4) and plug into the QSFP+ host 103, the 10GBase-T devices 102(1)-102(4) and the QSFP+ host 103 are able to exchange data communications with each other. For example, the 10GBase-T devices 102(1)-102(4) are configured to exchange data communications with the QSFP+ host 103 via the cable assembly 104. These data communications may be, for example, data communications in compliance with the ten gigabit Ethernet standard (hereinafter "10 G," "10 G data" or "10 G data communications") or 40 gigabit Ethernet standard (hereinafter "40 G," "40 G data" or "40 G data communications"). In one example, 10 G data may be sent from each of the 10GBase-T devices 102(1)-102(4) to the QSFP+ host 103 via the cable assembly 104, and 40 G (i.e., four 10 G data signals intended for each 10GBase-T device) data may be sent from the QSFP+ host 103 to the 10GBase-T devices 102(1)-102(4) via the cable assembly 104. Thus, the cable assembly 104 enables data channels for 10 G and 40 G communication between the 10GBase-T ports 106(1)-106(4) and the QSFP+ transceiver module 108 (and ultimately between the 10GBase-T devices 102(1)-102(4) and the QSFP+ host 103).

The 10GBase-T devices 102(1)-102(4) are configured to interface with corresponding 10GBase-T ports 106(1)-106(4) via, for example, the corresponding RJ45 ports (e.g., Ethernet ports). The 10GBase-T devices 102(1)-102(4) may connect to the RJ45 connectors such that connector pins (not shown) on the 10GBase-T ports with the RJ45 connectors engage corresponding connector pins on the 10GBase-T devices 102(1)-102(4) to enable an electrical connection between the 10GBase-T ports with the RJ45 connectors and the 10GBase-T devices 102(1)-102(4). Likewise, the QSFP+ transceiver module 108 is configured to interface with the QSFP+ host 103 via a set of connector pins to enable an electrical connection. Data can then be delivered between the QSFP+ transceiver module 108 and corresponding 10GBase-T ports 106(1)-106(4) (and ultimately between the QSFP+ host 103 and the 10GBase-T devices 102(2)-102(4)) via the cables 110(1)-110(4). Communications from the QSFP+ transceiver module 108 to the 10GBase-T ports 106(1)-106(4) may be referred to as host-to-network communications. Likewise, communications from the 10GBase-T ports 106(1)-106(4) to the QSFP+ transceiver module 108 are referred to as network-to-host communications.

The host-to-network communications may be 10 G data communications destined for one or more 10GBase-T devices 102(1)-102(4). Additionally, for host-to-network communications, the QSFP+ transceiver module 108 may receive 4×10 G data communications (e.g., four 10 G communications) from the QSFP+ host 103 (e.g., 40 G data communications) and may send each of the four 10 G communications to the appropriate 10GBase-T port 106(1)-106(4) that is connected to corresponding 10GBase-T devices 102(1)-102(4). Likewise, network-to-host communications may comprise 10 G data communications destined for the QSFP+ host 103. The QSFP+ host 103 may receive 4×10 G data communications (e.g., 40 G data communications) by receiving four 10 G data communications from the 10GBase-T devices 102(1)-102(4).

Figure 2:
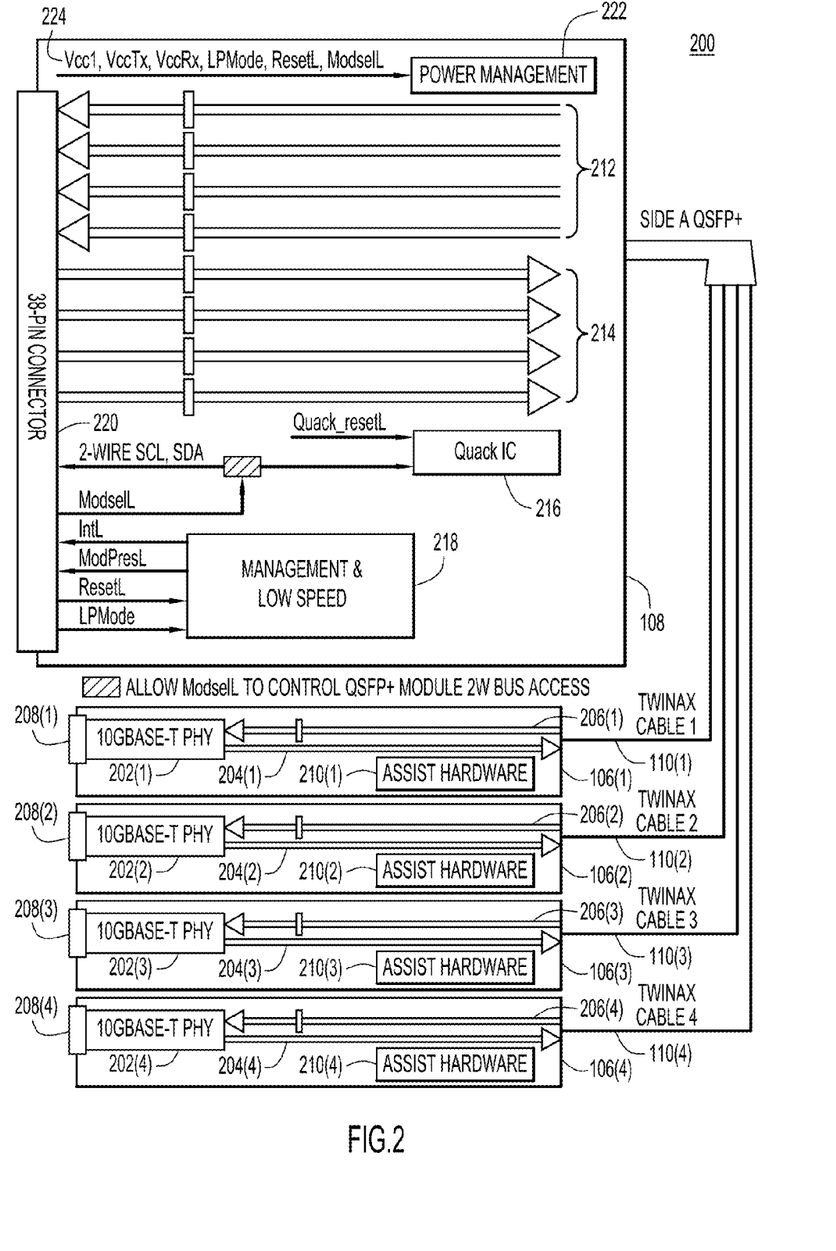
FIG. 2 shows example circuitry for the cable assembly that enables data communications between a QSFP host and a QSFP to 4×10GBase-T converter cable assembly.

Reference is now made to FIG. 2, which shows example circuitry 200 for the cable assembly 104 that enables data communication between the QSFP+ transceiver module and the 10GBase-T ports with the RJ45 connectors. As shown in FIG. 2, each of the cables 110(1)-110(4) at the system end is configured to interface with a corresponding one of the 10GBase-T ports 106(1)-106(4). The cables 110(1)-110(4) join together at the host end and connect into the QSFP+ transceiver module 108. The QSFP+ transceiver module 108 and the 10GBase-T ports 106(1)-106(4) enable host-to-network communications and network-to-host communications. In other words, the cables 110(1)-110(4) operate as data channels between the QSFP+ transceiver module 108 and the corresponding ones of the plurality of 10GBase-T ports 106(1)-106(4) and manage data flow between the QSFP+ transceiver module 108 and the 10GBase-T ports 106(1)-106(4). For example, the data channels provided by the cables 110(1)-110(4) are data channels that also deliver enhanced power, when necessary, to the 10GBase-T ports 106(1)-106(4), as described herein.

FIG. 2 shows a plurality of processor units 202(1)-202(4) for each of the 10GBase-T ports 106(1)-106(4). These processor units enable network-to-host communications sent from the 10GBase-T ports 106(1)-106(4) across respective egress data channels 204(1)-204(4) and enable host-to-network communications received by the 10GBase-T ports 106(1)-106(4) across respective ingress data channels 206(1)-206(4). FIG. 2 shows the RJ45 ports at 208(1)-208(4) that interface with the 10GBase-T devices 102(1)-102(4). Additionally, the 10GBase-T ports 106(1)-106(4) have assist hardware components that assist in enabling sending and receiving data communications. These assist hardware components are shown generally at reference numeral 210(1)-210(4).

FIG. 2 also shows components of the QSFP+ transceiver module 108. The QSFP+ transceiver module 108 comprises, among other components, an ingress data channel 212 to receive network-to-host communications from the 10GBase-T ports 106(1)-106(4) and an egress data channel 214 to send host-to-network communications. The QSFP+ transceiver module 108 also comprises an integrated circuit 216 ("Quack IC") and management and low speed circuitry 218. Additionally, the QSFP+ transceiver module 108 has a set of signal pins (referred to as "transceiver signal pins") shown at reference numeral 220. The transceiver signal pins 220 may be, for example, a 38-pin connector that is configured to interface with signal pins (e.g., "host signal pins") of the QSFP+ host 103 (not shown in FIG. 2). As described herein, certain pins on the transceiver signal pins 220 may be reassigned differently from the MSA standards to enable enhanced power delivery from the QSFP+ transceiver module 108 to the 10GBase-T ports 106(1)-106(4) to enable the network-to-host and host-to-network communications. The QSFP+ transceiver module 108 also comprises a power management unit 222 that is configured to receive enhanced power from the reassigned transceiver signal pins and to deliver the enhanced power to the 10GBase-T ports 106(1)-106(4). The power management unit 222 receives the enhanced power related signals from the reassigned pins which are depicted at reference numeral 224. The enhanced power delivery techniques are described in detail herein.

Figure 3:
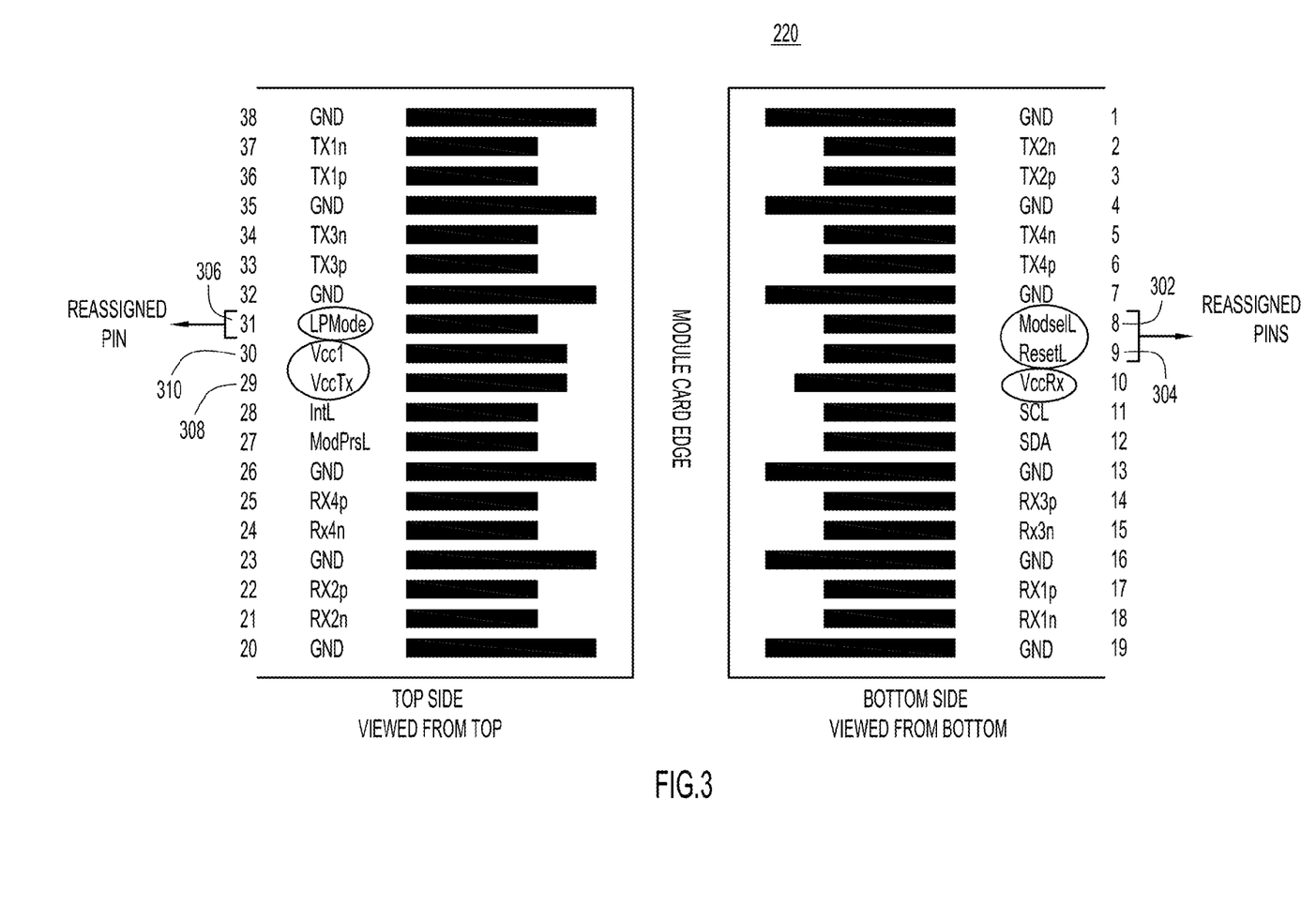
FIG. 3 shows an example set of transceiver signal pins of the QSFP transceiver module configured to interface with the QSFP host to deliver enhanced power to the cable assembly.

Reference is now made to FIG. 3, which shows an example set of transceiver signal pins 220 of the QSFP+ transceiver module 108. FIG. 3 shows a typical pin assignment for the transceiver signal pins 220 according to MSA standards for QSFP+ transceiver devices. However, since the techniques herein describe the QSFP+ transceiver module 108 configured to engage in host-to-network and network-to-host communications with a plurality of 10GBase-T ports 106(1)-106(4), additional power may be necessary to be delivered to the cable assembly 104. For example, each of the processor units 202(1)-202(4) of the 10GBase-T ports 106(1)-106(4) may consume approximately 1.5 watts of power with an additional 0.9 watts for power dissipation and other consumption requirements. Likewise, components of the QSFP+ transceiver module 108 may consume about 0.3 watts of power. Thus, the cable assembly 104 may require a total of 9.9 watts of power (2.4*4+0.3=9.9).

In order to accomplish this additional power delivery to the cable assembly 104, the assignment of some of the transceiver signal pins 220 may need to be changed to allow for enhanced power delivery from the QSFP+ host 103. Thus, when the signal pins 220 of the QSFP+ transceiver module 108 plug into the host signal pins of the QSFP+ host 103, enhanced power may be delivered to the QSFP+ transceiver module 108 and ultimately to the 10GBase-T ports 106(1)-106(4) via the reassigned pins. FIG. 3 shows pins 302, 304 and 306 (corresponding to pins "8," "9" and "31," respectively) as being reassigned to accommodate the enhanced power delivery requirements. Pins 308 and 310 (shown as pins 29 and 30, respectively) are already configured to receive power from the QSFP+ host 103.

Figure 4A:
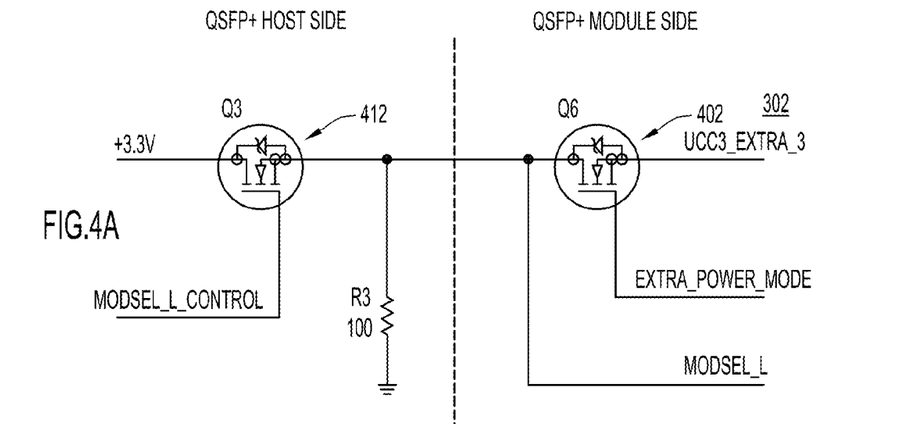
FIGS. 4A-4C are schematic diagrams of power circuitry for the cable assembly for power delivery between the QSFP host and the 10GBase-T ports with the RJ45 connectors.
Figure 4B:
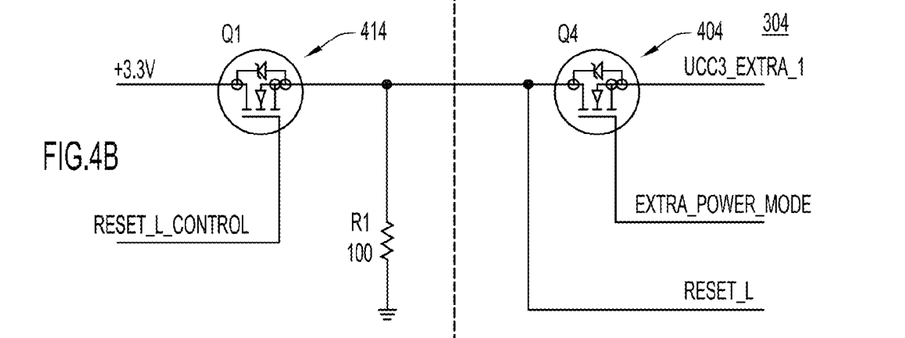
Figure 4C:
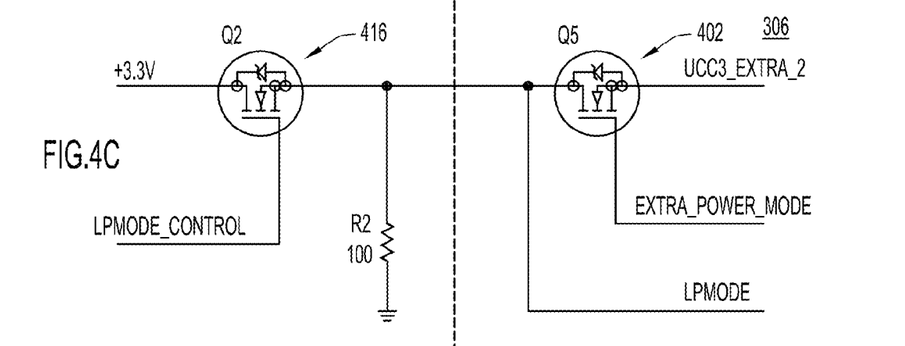

Reference is now made to FIGS. 4A-4C, which show example power circuitry of the power delivery signal path for each of the reassigned pins to enable the enhanced power delivery to the cable assembly 104. It should be appreciated that in FIGS. 4A-4C, the "QSFP+ host side" refers to the circuitry on the QSFP+ host 103, and the "QSFP+ module side" refers to the circuitry on the QSFP+ transceiver module 108.

FIGS. 4A-4C show the power circuitry for pins 302, 304 and 306 respectively. In FIGS. 4A-4C, the circuitry on the QSFP+ transceiver side comprises, e.g., an N-channel metal oxide semiconductor field effect transistor (MOSFET) (hereinafter "transistor") to switch to the high power mode from the standard QSFP IO pin mode. The transistors are shown at reference numerals 402, 404 and 406 in FIGS. 4A-4C, respectively. Similar transistors are also present on the QSFP+ host side, and they are shown at reference numerals 412, 414 and 416, respectively. It should be appreciated that any transistor and/or switch circuitry may be used, and the N-channel MOSFETs in FIGS. 4A-4C are merely examples. As shown, when enhanced power is to be delivered to the QSFP+ transceiver module 108, a turn-on voltage is applied to the respective gates of the transistors 402-406 on the QSFP+ module side, and the transistors on the QSFP+ module side "turn on." Simultaneously, on the QSFP+ host side, during enhanced power delivery operations, the QSFP+ host 103 also supplies a turn on voltage to the respective gates of the transistors 412-416, and the transistors on the QSFP+ host side also turn on. Thus, when the transistors 402-406 on the QSFP+ module side and the transistors 412-416 on the QSFP+ host side are turned on, the voltage supplied at the QSFP+ host (shown as +3.3 volts in FIGS. 4A-4C) is delivered to the QSFP+ module 108. This enables additional power to be delivered from the QSFP+ host 103 to the cable assembly 104 (and ultimately to the 10GBase-T ports 106(1)-106(4)). When enhanced power is not to be delivered to the QSFP+ transceiver module, the turn on voltage on the QSFP+ host side is not supplied to the respective gates of the transistors 412-416, and these transistors "turn off." In this example, the +3.3 volts is not supplied to the QSFP+ transceiver module 108. Thus, the transistors 402-406 and 412-416 can be selectively turned on to deliver enhanced power to the QSFP+ transceiver module 108 (and ultimately to the 10GBase-T ports 106(1)-106(n)).

Table 1, below, shows different logical arrangements for turning on the transistors 402-406 and 412-415 to deliver enhanced power to the QSFP+ transceiver module 108. As shown in Table 1, various permutations of turn-on voltages can be used to deliver enhanced power. It should be appreciated that the reference "L" in Table 1 refers to a low power turn-on voltage, while the reference "H" refers to a high power turn-on voltage.

As shown, for example, when the transistors 402-406 and 412-416 operate in the enhanced power mode, the following four settings need to be true: (1) Extra_Power_Mode=H; (2) Reset_L=H; (3) LPMode=H; and (4) ModSel_L=H. When the transistors are not operating in the enhanced power mode, the Reset_L, LPMode and ModSel_L operate with their traditional functions.

Figure 5:
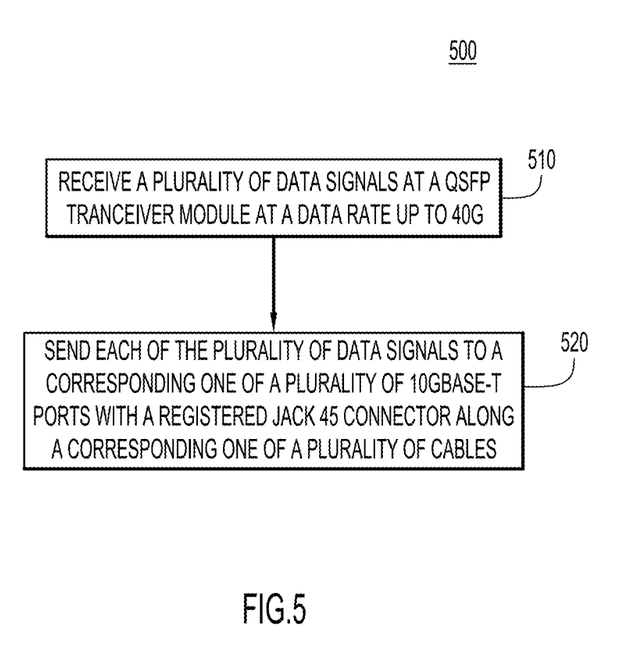
FIG. 5 shows an example flow chart depicting operations for data communications between the QSFP transceiver module and one or more of the 10GBase-T ports with the RJ45 connectors.

Reference is now made to FIG. 5, which shows an example flow chart 500 depicting operations for data communications between the QSFP+ transceiver module 108 and one or more of the 10GBase-T ports 106(1)-106(4). At reference numeral 510, the QSFP/QSFP+ transceiver module 108 is configured to receive a plurality of data signals at a data rate of up to 40 G. At operation 520, each of the plurality of data signals is sent to a corresponding one of a plurality of 10GBase-T ports 106(1)-106(4) with an RJ45 connector along a corresponding one of a plurality of cables 110(1)-110(4). As stated above, the QSFP/QSFP+ transceiver module 108 is configured to interface with the QSFP/QSFP+ host port 103, and the 10GBase-T ports 106(1)-106(4) are configured to interface with corresponding 10GBase-T enabled devices 102(1)-102(4).

It should be appreciated that the techniques described above in connection with all embodiments may be performed by one or more computer readable storage media that is encoded with software comprising computer executable instructions to perform the methods and steps described herein. For example, the operations performed by the cable assembly 104 may be performed by one or more computer or machine readable storage media or device executed by a processor and comprising software, hardware or a combination of software and hardware to perform the techniques described herein.

In summary, an apparatus is provided comprising: a quad small form-factor pluggable (QSFP) transceiver module configured to interface with a QSFP host and to send and receive a plurality of data signals at a data rate of up to forty gigabits per second (40 G); a plurality of 10GBase-T ports with Registered Jack (RJ) 45 connectors, wherein each of the 10GBase-T ports is configured to interface with a 10GBase-T device to send and receive a plurality of data signals at a data rate of ten gigabits per second (10 G); and a plurality of cables each of which is configured to interface with the QSFP transceiver module and with corresponding ones of the 10GBase-T ports with the RJ45 connectors, wherein each of the plurality of cables operates as a data channel for data flow between the QSFP transceiver module and the corresponding ones of the 10GBase-T ports with the RJ45 connectors.

TABLE 1

|  | HIGH_POWER_MODE = L | HIGH_POWER_MODE = H |
| --- | --- | --- |
| RESET_L_CONTROL = L | RESET_L = L | RESET_L = L |
|  | VCC3_EXTRA_1 = L | VCC3_EXTRA_1 = L |
| RESET_L_CONTROL = H | RESET_L = H | RESET_L = H |
|  | VCC3_EXTRA_1 = L | VCC3_EXTRA_1 = H |
| LPMODE_CONTROL = L | LPMODE = L | LPMODE = L |
|  | VCC3_EXTRA_2 = L | VCC3_EXTRA_2 = L |
| LPMODE_CONTROL = H | LPMODE = H | LPMODE = H |
|  | VCC3_EXTRA_2 = L | VCC3_EXTRA_2 = H |
| MODSEL_L_CONTROL = L | MODSEL_L = L | MODSEL_L = L |
|  | VCC3_EXTRA_3 = L | VCC3_EXTRA_3 = L |
| MODSEL_L_CONTROL = H | MODSEL_L = H | MODSEL_L = H |
|  | VCC3_EXTRA_3 = L | VCC3_EXTRA_3 = H |

In addition, a method is provided comprising: at a cable assembly, receiving a plurality of data signals at a quad small form-factor pluggable (QSFP) transceiver module that is configured to send and receive data signals at a data rate of up to forty gigabits per second (40 G); and sending each of the plurality of data signals to a corresponding one of a plurality of 10GBase-T ports with a Registered Jack (RJ) 45 connector along a corresponding one of a plurality of cables, wherein the corresponding 10GBase-T ports with the RJ45 connectors are configured to interface with corresponding 10GBase-T enabled devices to send and receive data at a data rate of ten gigabits per second (10 G).

Furthermore, a system is provided comprising: a host device configured to send one or more data signals destined for one or more system devices; a cable assembly comprising: a quad small form-factor pluggable (QSFP) transceiver module configured to interface with the host device and to send and receive a plurality of data signals at a data rate of up to forty gigabits per second (40 G); a plurality of 10GBase-T ports with Registered Jack (RJ) 45 connectors, wherein each of the 10GBase-T ports is configured to interface with one of the system devices to send and receive a plurality of data signals at a data rate of ten gigabits per second (10 G); and a plurality of cables each of which is configured to interface with the QSFP transceiver module and with corresponding ones of the 10GBase-T ports with the RJ45 connectors, wherein each of the plurality of cables operates as a data channel for data flow between the QSFP transceiver module and the corresponding ones of the 10GBase-T ports with the RJ45 connectors; and one or more system devices configured receive the data signals from the host device via the cable assembly.

The above description is intended by way of example only. Various modifications and structural changes may be made therein without departing from the scope of the concepts described herein and within the scope and range of equivalents of the claims.

What is claimed is:

1. An apparatus comprising:
   a quad small form-factor pluggable (QSFP) transceiver module configured to interface with a QSFP host and to send and receive a plurality of data signals at a data rate of up to forty gigabits per second (40 G), wherein the QSFP transceiver module includes a set of transceiver signal pins configured to interface with host signal pins of the QSFP host, and wherein the set of transceiver signal pins includes three signal pins configured to selectively receive data and enhanced power from the QSFP host;
   a plurality of 10 GBase-T ports with Registered Jack (RJ) 45 connectors, wherein each of the 10 GBase-T ports is configured to interface with a 10 GBase-T device to send and receive a plurality of data signals at a data rate of ten gigabits per second (10 G); and
   a plurality of cables each of which is configured to interface with the QSFP transceiver module and with corresponding ones of the 10 GBase-T ports with the RJ45 connectors, wherein each of the plurality of cables operates as a data channel for data flow between the QSFP transceiver module and the corresponding ones of the 10 GBase-T ports with the RJ45 connectors.

2. The apparatus of claim 1, wherein each of the plurality of cables is configured to operate as a 10 G data channel between the QSFP transceiver module and the corresponding ones of the 10 GBase-T ports with the RJ45 connectors.

3. The apparatus of claim 1, wherein the QSFP transceiver module is an enhanced QSFP (QSFP+) transceiver module.

4. The apparatus of claim 1, wherein each of the plurality of cables is further configured to deliver the enhanced power from the QSFP transceiver module to each of the 10 GBase-T ports with the RJ45 connectors.

5. The apparatus of claim 1, wherein the one or more of the three signal pins are configured to receive the enhanced power from the QSFP host along respective signal paths, each of which comprises a transistor device that enables enhanced power to be delivered from the QSFP host to the QSFP transceiver module in a high-power mode.

6. The apparatus of claim 1, wherein one or more of the three signal pins are configured to receive the enhanced power when the QSFP host is an enhanced QSFP host (QSFP+).

7. A method comprising:
   at a cable assembly, receiving a plurality of data signals at a quad small form-factor pluggable (QSFP) transceiver module that is configured to send and receive data signals at a data rate of up to forty gigabits per second (40 G);
   sending each of the plurality of data signals to a corresponding one of a plurality of 10 GBase-T ports with Registered Jack (RJ) 45 connectors along a corresponding one of a plurality of cables, wherein the corresponding 10 GBase-T ports with the RJ45 connectors are configured to interface with corresponding 10 GBase-T enabled devices to send and receive data at a data rate of ten gigabits per second (10 G); and
   delivering enhanced power via a set of transceiver signal pins of the QSFP transceiver module configured to interface with host signal pins of a QSFP host, wherein the set of transceiver signal pins includes three signal pins configured to selectively receive data and enhanced power from the QSFP host.

8. The method of claim 7, wherein sending comprises sending each of the plurality of data signals along the corresponding cables, each of which operates as a data channel for data flow between the QSFP transceiver module and the corresponding 10 GBase-T ports with the RJ45 connectors.

9. The method of claim 7, wherein sending comprises sending each of the plurality of data signals to each of the corresponding 10 GBase-T ports along the corresponding cables, wherein each of the corresponding cables is configured to operate as a 10 G data channel between the QSFP transceiver module and one of the 10 GBase-T ports.

10. The method of claim 7, further comprising receiving the plurality of data signals at an enhanced QSFP (QSFP+) transceiver module.

11. The method of claim 7, wherein delivering comprises delivering the enhanced power from the QSFP transceiver module to each of the 10 GBase-T ports with the RJ45 connectors.

12. The method of claim 7, wherein delivering comprises delivering the enhanced power from the QSFP host along respective signal paths associated with the three signal pins, wherein each of the respective signal paths comprises a transistor device that enables enhanced power to be delivered from the QSFP host to the QSFP transceiver module in a high-power mode.

13. A system comprising:
   a host device configured to send one or more data signals destined for one or more system devices;
   a cable assembly comprising:
      a quad small form-factor pluggable (QSFP) transceiver module configured to interface with the host device and to send and receive a plurality of data signals at a data rate of up to forty gigabits per second (40 G), wherein the QSFP transceiver module includes a set of transceiver signal pins configured to interface with host signal pins of the QSFP host, wherein the set of transceiver signal pins includes three signal pins configured to selectively receive data and enhanced power from the QSFP host;

a plurality of 10 GBase-T ports with Registered Jack (RJ) 45 connectors, wherein each of the 10 GBase-T ports is configured to interface with one of the system devices to send and receive a plurality of data signals at a data rate of ten gigabits per second (10 G); and a plurality of cables each of which is configured to interface with the QSFP transceiver module and with corresponding ones of the 10 GBase-T ports with the RJ45 connectors, wherein each of the plurality of cables operates as a data channel for data flow between the QSFP transceiver module and the corresponding ones of the 10 GBase-T ports with the RJ45 connectors; and one or more system devices configured to receive the data signals from the host device via the cable assembly.

14. The system of claim 13, wherein each of the plurality of cables is configured to operate as a 10 G data channel between the QSFP transceiver module and the corresponding ones of the 10 GBase-T ports with the RJ45 connectors.

15. The system of claim 13, wherein the QSFP transceiver module is an enhanced QSFP (QSFP+) transceiver module.

16. The system of claim 13, wherein each of the plurality of cables is further configured to deliver the enhanced power from the QSFP transceiver module to each of the 10 GBase-T ports with the RJ45 connectors.

17. The system of claim 13, wherein the one or more of the three signal pins are configured to receive the enhanced power from the QSFP host along respective signal paths each of which comprises a transistor device that enables enhanced power to be delivered from the QSFP host to the QSFP transceiver module in a high-power mode.

* * * * *